United States Patent [19]

Painton

[11] Patent Number: 4,544,969

[45] Date of Patent: Oct. 1, 1985

[54] SERVOMECHANISM FOR DISC PLAYER

[75] Inventor: Richard C. Painton, Webster, N.Y.

[73] Assignee: Eastman Kodak Company, Rochester, N.Y.

[21] Appl. No.: 553,893

[22] Filed: Nov. 21, 1983

[51] Int. Cl.$^4$ ............................ G11B 5/54; G11B 5/58
[52] U.S. Cl. .......................................... 360/78; 360/77
[58] Field of Search ....................... 360/77, 78; 369/43, 369/44

[56] References Cited

U.S. PATENT DOCUMENTS

| | | | |
|---|---|---|---|
| 3,825,323 | 7/1974 | Landwer | 350/255 |
| 4,198,657 | 4/1980 | Kanamaru | 358/128.5 |
| 4,239,942 | 12/1980 | Van Alem et al. | 179/100.1 |
| 4,334,276 | 6/1982 | Turnbull | 364/561 |
| 4,337,534 | 6/1982 | Basilico et al. | 369/111 |
| 4,338,682 | 7/1982 | Hosaka et al. | 369/44 |
| 4,344,165 | 8/1982 | Akiyama | 369/44 |
| 4,365,324 | 12/1982 | Michaelis | 369/44 |
| 4,371,959 | 2/1983 | McGuffin | 369/43 |
| 4,371,960 | 2/1983 | Kroiss | 369/43 |

Primary Examiner—George G. Stellar
Attorney, Agent, or Firm—Robert F. Cody

[57] ABSTRACT

During a first phase of operation for a disc player incorporating the invention, a derived playback signal which is "above" a signal level of a threshold effects head motion in a given direction. During a second phase of disc player operation, the derived playback signal is again compared with the threshold, only this time a signal that is "below" the threshold effects head motion in the "same" given direction. During a third phase of operation, the derived signal, when at or above the threshold, initiates an incremental drive for the head. Such a drive steps the head in the given direction so long as the lowest playback signal level, during each given disc rotation, continues to increase. Thus, during this third phase of disc player operation, the head settles to a track location which is "invariantly" maximized. This means, therefore, that track eccentricity has absolutely no influence during playback of the track.

15 Claims, 4 Drawing Figures

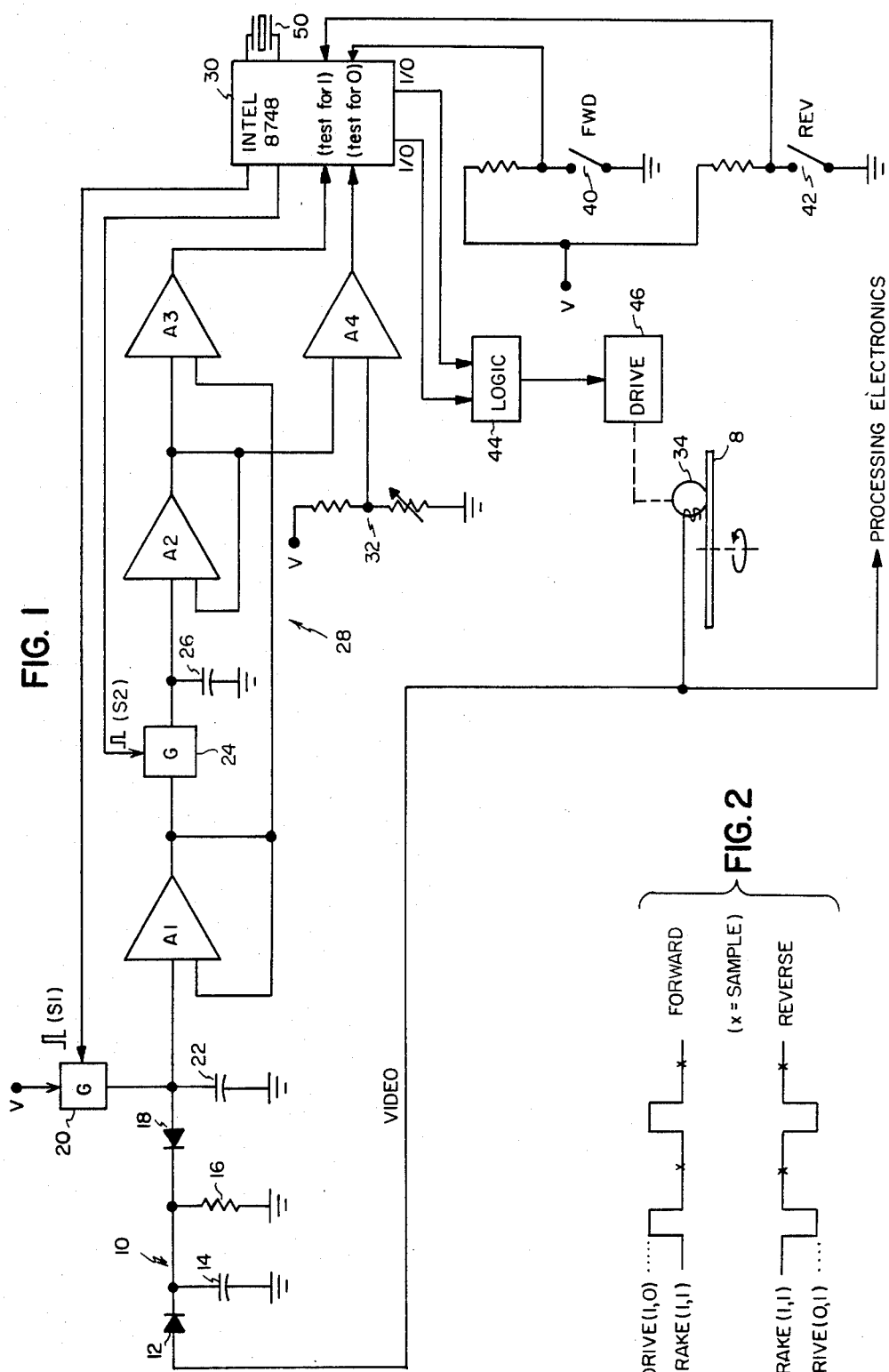

SERVOMECHANISM FOR DISC PLAYER

BACKGROUND OF THE INVENTION

1. Field of the Invention

This invention relates in general to servo mechanisms and, more particularly, to servos for controlling the position of a playback head to a given playback track of a rotating information-bearing disc containing a plurality of such tracks. While the invention is not so limited, it is cast in the environment of apparatus for use with a magnetic disc having video information recorded thereon; and, in the interest of simplicity, the type servo employed is a static servo (i.e. one that drives to a given track position for the head, and thereafter holds that track position), rather than a dynamic servo which continuously seeks an optimal track position for the head in question.

2. Preliminary discussion as to the inventive static servo, and to various problems which it addresses:

As will appear below, the inventive static servo derives its control from each selected track of the disc in question. Such a technique is advantageous because it allows positive control to a track by means of that track. The derivation of such control, however, embraces certain problems, and such problems influence the operation of the servo. For example:

1. Given that the playback head is located at a first track, one would wonder how it would be possible for the servo to derive its control for positioning the head to a selected "different" track.

2. Given that the playback head is, however, en route to the selected "different" track, but is located within the essentially signal-free guard band that is usually found between tracks, one would also wonder how it would be possible for head-positioning to be brought under control of the selected "different" track.

3. Assuming the selected "different" track, to which the playback head is to be positioned, was recorded eccentrically, one would also wonder how it would be possible to position the head so that its output does not get amplitude modulated as the head picks up more, or less, signal from the eccentrically recorded track.

Absent the invention, the first of the above-listed items would manifest itself in having the playback head lock onto—and resist ever leaving—a given track. As to the second of the above-listed items, such would manifest itself by presenting ambiguous control to the positioning of the playback head. And, as to the third of the above-listed items, this would not only cause the indicated modulation of the playback head output, but (because head position control is derived from the track itself) could possibly result in aberrant operation of the servo.

SUMMARY OF THE INVENTION

Pursuant to the invention, a signal threshold is established. During a first phase of operation for a disc player incorporating the invention, a derived playback signal which is "above" the signal level of the threshold effects head motion in a given direction (item #1 above). During a second phase of disc player operation, the derived playback signal is again compared with the threshold, only this time a signal that is "below" the threshold effects head motion in the "same" given direction (item #2 above). During a third phase of operation, the derived signal, when at or above the threshold, initiates an incremental drive for the head. Such a drive steps the head in the given direction so long as the lowest playback signal level, during each given disc rotation, continues to increase (item #3 above). Thus, during this third phase of disc player operation, the head settles to a track location which is "invariantly" maximized. This means, therefore, that track eccentricity has absolutely no influence during playback of the track.

A microprocessor is programmed to effect servo operation as indicated above.

THE FIGURES

The invention will now be described with reference to the figures of which

FIG. 1 is a schematic block diagram of apparatus embodying the invention,

FIG. 2 and FIG. 3 depict waveform diagrams useful in describing the apparatus of FIG. 1.

Figure 3:
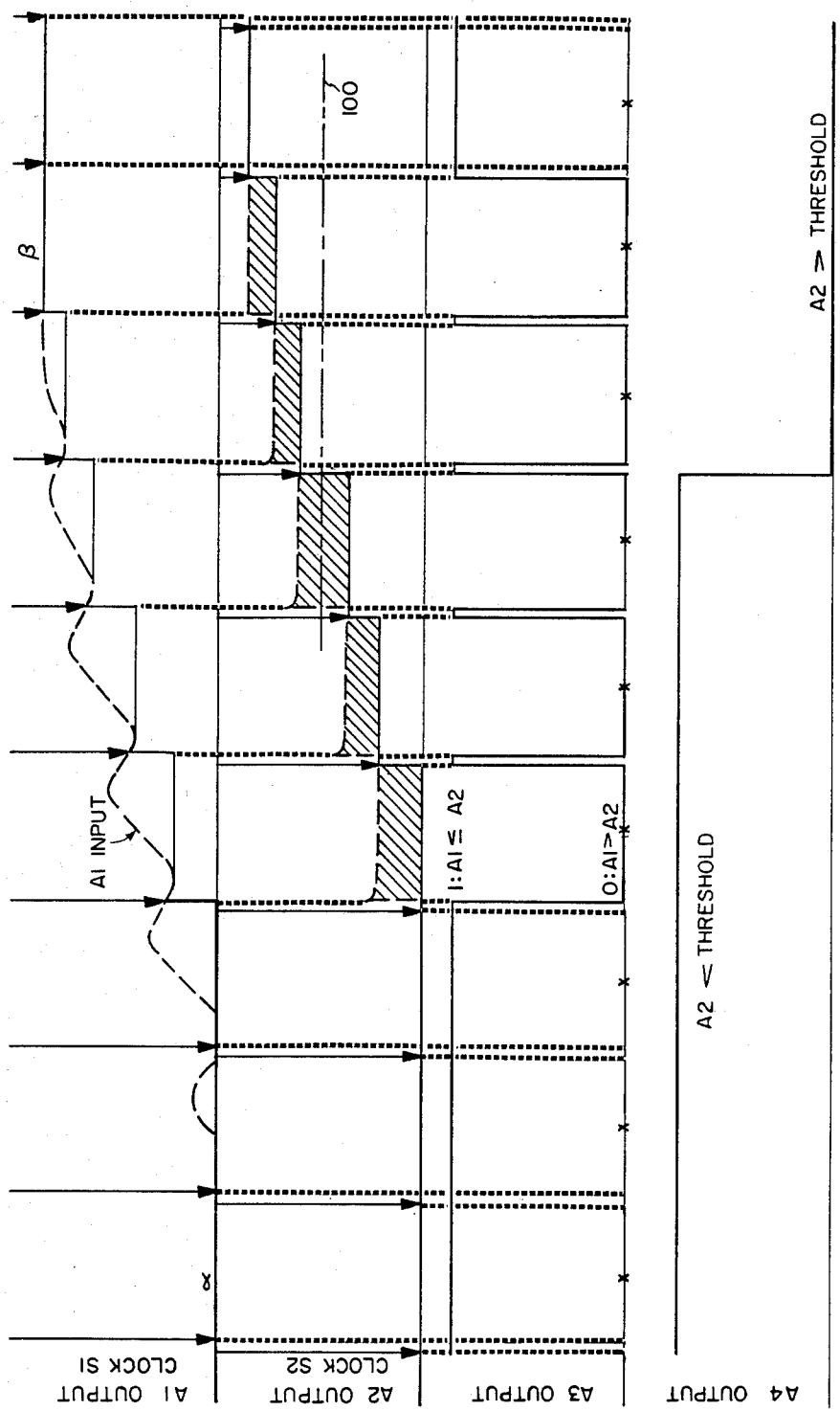

Referring to FIG. 1, the envelope of a frequency modulated (f.m.) video signal (such signal having been recorded in a track of a multi-track magnetic disc) is produced by means of a detector 10 comprised of a diode 12, a capacitor 14, and a resistor 16, across which a dc envelope signal is developed. The dc envelope signal is applied through a reverse-biased diode 18 to a unity-gain amplifier A1 serving as part of a signal "valley" detector. Operation of the signal valley detector is dependent on cooperation among the diode 18, a gate 20, and a capacitor 22. Given that the envelope of the f.m. video signal that is developed across the resistor 16 varies between certain limits (because of track eccentricity) the lowest level of such signal is identified and stored (capacitor 22). Such level identification and storage is effected as follows: At an appropriate time, the gate 20 is closed, causing the voltage across the capacitor 22 momentarily to rise toward the signal level V. Charge stored by the capacitor 22 bleeds off through the diode 18 until the voltage across the capacitor 22 corresponds to the smallest voltage that is developed across the resistor 16, i.e. the capacitor 22 stores the signal "valley" of the detected envelope signal. Should it occur that the envelope signal thereafter starts to rise, such signal will then back-bias the diode 18 to preserve the signal "valley" that appears across the capacitor 22. As will perhaps be better appreciated below, it is this practice of identifying signal valleys (as opposed to identifying signal peaks)—and head positioning pursuant thereto—that causes the head, when properly positioned, to be immune to eccentricity-caused variation in the playback of signals from a disc track.

The detected signal "valley" is sampled (gate 24)-and-held (capacitor 26) by a circuit 28 comprising a unity gain amplifier A2. By means of a comparison amplifier A3, each signal "valley" (i.e. the output of amplifier A1) is compared signal-wise with a just-prior signal "valley" (i.e. the output of amplifier A2). The amplifier A3 has exceptionally high gain; and so, should there be a change between the two inputs to the comparison amplifier A3, the output thereof snaps to a ONE or ZERO state depending on the relative strengths of two signals which are applied to the comparison amplifier A3. The output of the comparison amplifier A3 is applied to a microprocessor 30, operation of which will be described later.

The above-mentioned signal threshold—which is so important to the operation of the invention—is provided by means of a voltage divider 32. A second comparison amplifier A4 receives the threshold signal of the voltage divider 32 and compares such signal with the "held" signal of the amplifier A2. The comparison amplifier A4, like the amplifier A3, has exceptionally high gain; and so the output of the amplifier A4 also snaps between a ZERO and a ONE state, depending on whether the threshold and 37 held" signals suddenly become alike or different. The output of the amplifier A4 is also applied to the microprocessor 30.

Given that a head 34 is to be positioned radially of the disc 8, thereby to move from one circular track on the disc to another circular track, either a switch 40 or a switch 42 is actuated depending respectively on whether the head is to move forward or in reverse relative to the periphery of the disc 8. Closing the switch 40, or the switch 42, causes a corresponding ZERO (as opposed to a ONE for an opened switch) to be applied to the microprocessor 30.

The microprocessor 30 produces a 2-bit coded output which is deciphered by logic 44. A drive 46, responsive to the deciphered output of the microprocessor 30, then positions the head accordingly. FIG. 2 depicts forward drive, reverse drive, and brake signal voltages corresponding respectively to microprocessor 30 outputs of 1, 0; 0, 1; and 1, 1.

Before discussing the operation of the microprocessor 30, it is thought best first to address the workings of the amplifier A1, A2, A3, and A4. Accordingly, reference should be had to the waveform diagrams of FIG. 3: As the head 34 of FIG. 1 gets radially positioned, say to an eccentrically recorded track, the input to the amplifier A1 gradually increases from non-existence ($\alpha$), i.e. when the head is located within a track-to-track guard band, to a maximum level $\beta$. (When the head 34 is located so as to produce the signal level $\beta$, it is so situated with respect to the track in question that it picks up the largest invariant signal that it can, thereby providing immunity to the effects of track eccentricity as discussed above.) In response to a clock signal S1, produced by means of the microprocessor 30 under control of a crystal 50, the gate 20 causes the output of the amplifier A1 to be as depicted. Sometime before each next clock signal S1 occurs, a clock signal S2 is produced to sample (and hold), the "valley" of the signal produced by the amplifier A1. Thus, the amplifier A3 receives, and compares, successive samples of the track envelope signal. Given that each later sample is greater than an earlier sample (i.e. A1>A2)—signifying that the head 34 is getting closer and closer to an optimal track position—the output of the amplifier A3 applies a ZERO to the microprocessor 30; contrarily, should a later sample of the envelope signal become equal to or less than a next earlier sample (i.e. A1≦A2), the output of the amplifier A3 snaps (because of its high gain) to a ONE state, signifying that further positioning of the head 34 will cause it to lose its optimal position.

Concerning the matter of the all important threshold (above which, and below which, the "held" signal of amplifier A2 causes head positioning to be effected in the "same" direction under control of the algorithm associated with the microprocessor 30), such is depicted (100) in association with the A2 waveform of FIG. 3. As will be appreciated, when the head 34 moves from a track-to-track guard band toward a selected track, the "held" video signal envelope gradually increases to, and then goes through, the threshold. Similarly, as the head 34 moves from one selected track to another selected track, the video signal envelope first gradually decreases to, and then drops through, the threshold. In this way—and as will be appreciated better in connection with FIG. 4—the threshold serves to signify whether the head is at—but moving in a given direction away from—an undesired track, or moving—in that same given direction—to a desired different track. When the video signal that is "held" by the amplifier A2 is less than the threshold (A2<threshold), the output of the amplifier A4 is a ONE; when the video signal that is "held" by the amplifier A2 is greater than the threshold (A2>threshold), the output of the amplifier A4 is a ZERO.

Figure 4:
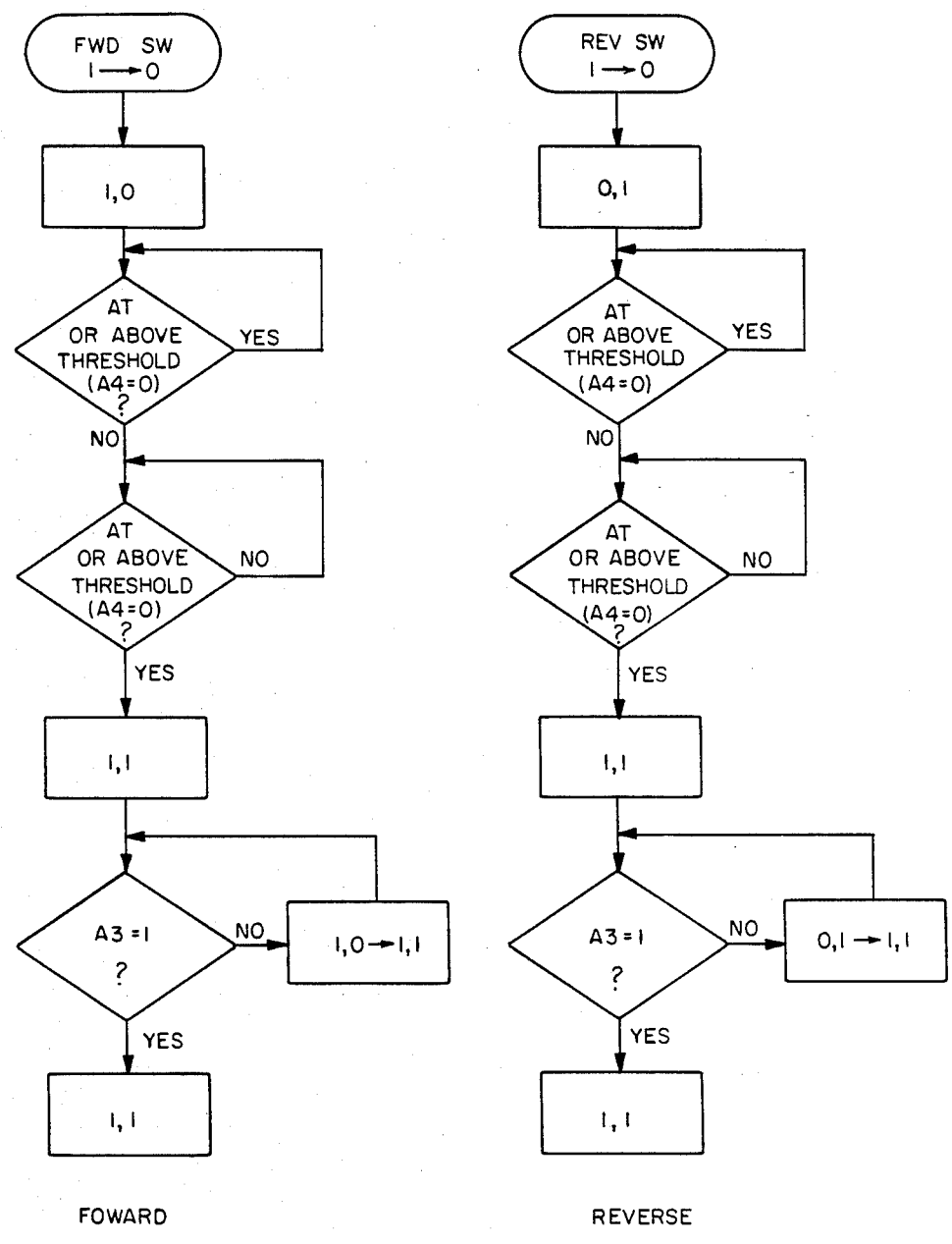
FIG. 4 depicts flow diagrams useful in explaining the programming of a microprocessor used in conjunction with the invention.

Reference should also now be had to the flow diagrams of FIG. 4 which correspond to the programming of the microprocessor 30: Given that the head 34 is to be moved (forward) from a first track to a second track, the switch 40 is actuated, thereby causing an appropriate ZERO to be applied to the microprocessor 30. Immediately, the microprocessor 30 inquires as to whether the "held" video signal envelope is at or above the signal threshold 100. Since the head is situated with respect to the first track, the "held" video signal envelope produced thereby will clearly be above the threshold 100; and attendantly an affirmative response will be productive of a 1, 0 microprocessor output. Pursuant to the showing of FIG. 2, the 1, 0 output will cause the drive 46 to position the head 34 (continuously) toward the second track. As soon as the "held" video signal envelope drops through the signal threshold 100, the system operation is free of the problem identified above in "Preliminary Discussion etc" as item #1. Continued inquiry thereafter as to whether the "held" video signal envelope is at or above the signal threshold 100 initiates a second phase of operation for the microprocessor 30. Since the head 34 is in the throes of leaving the first track as it heads for the desired second track, the "held" video signal envelope continues to decrease in amplitude, and attendantly the inquiry in question is productive of a negative response. A negative response during this second phase operation again causes a 1, 0 microprocessor 30 output, thereby causing the microprocessor to continue to cause the head 34 to be moved in the same direction (i.e. toward the second track), despite the fact that the "held" video signal envelope is now below the threshold 100. Eventually, the "held" video signal envelope, resulting from operation of the head 34, moves back through the threshold 100, at which time the microprocessor enters a third phase of operation. Because the head 34 had continuously been positioned toward the desired second track—by virtue of the "held" video signal envelope being below the threshold 100—the problem appearing above in "Preliminary Discussion etc", item #2, is avoided.

As soon as the third phase operation begins, the microprocessor 30 produces a momentary brake command (1, 1), during which "moment" the microprocessor 30 inquires as to whether the earlier or later of each latest pair of "valley" signals is greater, i.e. is the A3 output a ONE or a ZERO? Assuming the later-occurring "valley" signal (A1 output) is greater, i.e. A1>A2, the A3 output is a ZERO; and hence the answer to the inquiry in question is negative. Attendantly, a drive pulse (1, 0) is applied to the drive 46 . . . followed immediately by a brake command (1, 1). See FIG. 2. This process of pulsing, following by braking, is repeated over and over under control of the microprocessor 30, thereby incrementally urging the head 34 closer and closer to an eccentricity-immune position relative to the desired second track. Thus, item #3, as appears above in "Preliminary Discussion etc.", is addressed. At the very moment that the later occurring "valley" signal of a successive pair of signals has an amplitude that is equal to or less than that of the earlier occurring "valley" signal, i.e. $A1 \leq A2$, the "A3" inquiry is affirmatively answered (signifying that the head 34 is about to leave its optimal location), a brake command (1, 1) is applied to the drive 46. To change head position, then, from the second track to a third track, the above process is repeated by again actuating the switch 40.

As will be appreciated, head positioning in a reverse direction is accomplished in a similar way by actuating the switch 42.

The invention has been described in detail with particular reference to certain preferred embodiments thereof, but it will be understood that variations and modifications can be effected within the spirit and scope of the invention.

What is claimed is:

1. A static servo for use in positioning a playback head from a first generally circular track of a rotatable record disc having a plurality of generally circular tracks thereon to a second such track thereof comprising
   (a) means for receiving the output signal of said head and for producing in response thereto a signal corresponding to the amplitude of said output signal,
   (b) means for producing a reference threshold signal,
   (c) means for receiving and comparing said amplitude and threshold signals for
      1. positioning said head in a given direction toward said second track when said amplitude signal is greater than said threshold signal, thereby to cause said amplitude signal gradually to become smaller than said threshold signal as said head moves from said first track, and
      2. positioning said head in said given direction after said amplitude signal becomes smaller than said threshold signal, thereby to cause said amplitude signal again to become greater than said threshold signal as the position of said head, more and more, coincides with said second track, and
   (d) means for detecting when said amplitude signal attains a certain level and, in response thereto, interrupting the positioning of said head, thereby to effect playback of said second track by means of said head.

2. The apparatus of claim 1 wherein said means for receiving the output signal of said head comprises means for producing the envelope of said signal.

3. The apparatus of claim 2 wherein said means for detecting comprises
   (a) means for isolating and storing, for successive rotations of said disc, the smallest signal envelope that is produced during each such disc rotation, thereby to lessen the effects of track eccentricity on the magnitude of each such stored signal envelope,
   (b) means for comparing pairs of successively produced stored signal envelopes, and
   (c) means for detecting when the later occurring of such successively produced stored signal envelopes is greater in amplitude than the earlier occurring stored signal envelope.

4. The apparatus of claim 3 further comprising microprocessor means, cooperative with both said means for comparing and said means for detecting, for controlling the positioning of said head.

5. The apparatus of claim 1 further comprising microprocessor means, cooperative with both said means for comparing and said means for detecting, for controlling the positioning of said head.

6. The apparatus of claim 1 wherein (a) said record disc is a magnetic record disc and (b) said head is a magnetic head.

7. The apparatus of claim 6 wherein said means for detecting comprises
   (a) means for isolating and storing, for successive rotations of said disc, the smallest signal envelope that is produced during each such disc rotation, thereby to mute the effects of track eccentricity on the magnitude of each such stored signal envelope,
   (b) means for comparing pairs of successively produced stored signal envelopes, and
   (c) means for detecting when the later occurring of such successively produced stored signal envelopes is greater in amplitude than the earlier occurring stored signal envelope.

8. The apparatus of claim 7 further comprising microprocessor means, cooperative with both said means for comparing and said means for detecting, for controlling the positioning of said head.

9. The apparatus of claim 6 further comprising microprocessor means, cooperative with both said means for comparing and said means for detecting, for controlling the positioning of said head.

10. Servo apparatus for use in positioning a magnetic playback head from a first generally circular information-bearing track of a rotatable magnetic disc to a second generally circular information-bearing track thereof, said tracks being susceptible to undesirable eccentricity therein, comprising
   (a) means for isolating and storing the approximately smallest signal amplitude produced by said magnetic head during each successive rotation of said disc, thereby to provide playback signals that are essentially immune to the effects of track eccentricity,
   (b) means for establishing a threshold signal amplitude,
   (c) first signal comparing means for comparing each said isolated signal amplitude with said threshold signal amplitude,
   (d) means responsive to the output of said first signal comparing means for moving said head in a given direction from said first track toward said second track when the output of said first signal comparing means is of a first sense, thereby to cause the output of said first signal comparing means eventually to be of a second sense, and for thereafter moving said head in that same given direction towards said second track when the output of said first signal comparing means has said second sense, and
   (e) second signal comparing means cooperative with said means for isolating for comparing successive isolated signal amplitudes,
said means responsive to the output of said first signal comparing means being further responsive to the output of said second signal comparing means for further moving said head in said given direction when the output of said second signal comparing means has a first sense and for interrupting the positioning of said head when the output of said second signal comparing means is of a second sense.

11. The apparatus of claim 10 wherein said means responsive to the outputs of both said signal comparing means is a microprocessor.

12. The apparatus of claim 10 wherein said means for isolating and storing comprises
   (a) an envelope signal detector responsive to the output of said magnetic head
   (b) means for detecting approximately the smallest envelope signal that occurs during each rotation of said disc, and
   (c) a sample-and-hold circuit for receiving and storing said detected envelope signals.

13. Servo apparatus for use in positioning a magnetic playback head from a first generally circular track of a rotatable magnetic disc to either a more inwardly or a more outwardly disposed second track of said disc, said tracks being susceptible to undesired eccentricity therein, comprising
   (a) means for producing a control signal for signifying whether said head is to be positioned from said first track to said more inwardly or said more outwardly disposed second track,
   (b) means for isolating and storing the smallest signal amplitude produced by said magnetic head during each successive rotation of said disc, thereby to provide playback signals that are immune to the effects of track eccentricity,
   (c) means for establishing a threshold signal amplitude,
   (d) first signal comparing means for comparing each said isolated signal amplitude with said threshold signal amplitude,
   (e) means for receiving said control signal and the output of said first signal comparing means for moving, under directional control of said control signal, said head in a given direction from said first track toward said second track when the output of said first signal comparing means is of a first sense, and for thereafter moving said head in that same given direction toward said second track when the output of said first signal comparing means has a second sense, and
   (f) second signal comparing means cooperative with said means for isolating for comparing successive isolated signal amplitudes,
   said means for receiving said control signal and the output of said first signal comparing means further receiving the output of said second signal comparing means for further moving said head in said given direction when the output of said second signal comparing means is of a first sense and for interrupting the positioning of said head when the output of said second signal comparing means is of a second sense.

14. The apparatus of claim 13 wherein said means responsive to the output of said signal comparing means is a microprocessor.

15. The apparatus of claim 13 wherein said means for isolating and storing comprises
   (a) an envelope signal detector responsive to the output of said magnetic head,
   (b) means for detecting the approximately smallest envelope signal that occurs during each rotation of said disc, and
   (c) a sample-and-hold circuit for receiving and storing said detected envelope signals.

* * * * *